United States Patent Office 3,312,680
Patented Apr. 4, 1967

3,312,680
PROCESS FOR POLYMERIZING ISOPRENE WITH A LITHIUM CATALYST AND A HALOGEN ADJUVANT
Gerald R. Kahle, Bartlesville, Okla., assignor to Phillips Petroleum Company, a corporation of Delaware
No Drawing. Filed Sept. 1, 1965, Ser. No. 484,461
16 Claims. (Cl. 260—94.2)

This application is a continuation-in-part of application Ser. No. 137,015, filed Sept. 11, 1961, now abandoned, and application Ser. No. 450,206, filed Apr. 22, 1965, now abandoned.

This invention relates to the polymerization of isoprene to form rubbery polymeric products of improved properties. In one aspect, this invention relates to an improved process for producing high cis-polyisoprene in a condition which can be readily processed. In another aspect, this invention relates to an improved catalyst composition for producing cis-polyisoprene.

Heretofore although polyisoprene has been produced in the presence of organolithium initiators, the products frequently have a higher inherent viscosity than desired and are also difficult to process, i.e., extrusion rates are low, the edges of the extrudate are rough, and the polymers tend to be baggy and crumbly on the mill.

Quite surprisingly, it has now been found that high cis-polyisoprene of improved processability characteristics can be formed by polymerizing isoprene with a polylithium initiator in the presence of an organic halogen compound. The polylithium initiator is prepared from polycyclic aromatic compounds, polyaryl-substituted ethylenes containing from 2 to 4 aryl groups selected from the group consisting of phenyl and naphthyl and bihalogen-containing polyaryl-substituted ethanes. The organic halide is at least one compound selected from the group consisting of saturated aliphatic, saturated cycloaliphatic and aromatic halides, preferably saturated aliphatic halides. It has further been found that alkyllithium initiators do not effect the same results as the above polylithium initiators.

Quite surprisingly, it has also been found that high cis-polyisoprene can be formed by polymerizing isoprene with an initiator formed by reacting lithium with a material selected from the group consisting of polycyclic aromatic compounds and polyaryl-substituted ethylenes containing from 2 to 4 aryl groups selected from the group consisting of phenyl and naphthyl, in the presence of a halogen adjuvant selected from the group consisting of hydrogen halide and free halogen.

Accordingly, it is an object of this invention to provide an improved process for producing polyisoprene. It is another object of this invention to provide a new catalyst composition for producing polyisoprene.

Other aspects, objects and the several advantages of the invention will be readily apparent to those skilled in the art from the description and the appended claims.

According to this invention a process and catalyst system are provided for lowering the inherent viscosity of polyisoprene with no sacrifice in cis content even though higher cis contents generally produce higher inherent viscosities. Thus, one notable advantage of the present invention is that the inherent viscosity can be controlled without sacrifice or lowering of the cis content. While the present invention is not dependent upon any particular reaction mechanism, the halogen adjuvants employed are regarded as modifiers and as processing aids. The isoprene polymers of this invention have lower inherent viscosity than is otherwise obtained, better extrusion properties, and exhibit good mill banding.

The organic halogen compounds employed in one aspect of this invention have the formula RX wherein X is a halogen selected from the group consisting of chlorine, bromine, iodine and fluorine and R is a hydrocarbon radical selected from the group consisting of saturated aliphatic, saturated cycloaliphatic and aromatic radicals containing from 1 to 12 carbon atoms, inclusive, preferably 1 to 9 carbon atoms, inclusive, and combinations thereof.

The hydrogen halide and free halogen compounds of another aspect of this invention have the formulas HX and $X_2$, respectively, wherein X is a halogen selected from the group consisting of chlorine, bromine, iodine and fluorine.

Representative examples of suitable halogen adjuvants that can be employed according to the invention include fluorine, chlorine, bromine, iodine, hydrogen fluoride, hydrogen chloride, hydrogen bromide, hydrogen iodide, methyl chloride, methyl bromide, isopropyl iodide, isobutyl iodide, n-butyl chloride, n-butyl bromide, n-hexyl iodide, n-hexyl fluoride, n-dodecyl chloride, cyclopentyl fluoride, cyclohexyl iodide, 4-methylcyclohexyl fluoride, 4-bromocyclohexane, bromobenzene, chlorobenzene, 4-iodotoluene, benzyl chloride, and the like. Of the above halogen adjuvants, the n-alkyl bromides are preferred.

The amount of halogen adjuvant employed during polymerization can vary appreciably and the amount is generally expressed in terms of gram atoms of lithium in the initiator per gram atom of halogen in the adjuvant. Generally, the amount of halogen employed is in the range of from 0.25 to 20 gram atoms of lithium, preferably from 1 to 10 gram atoms of lithium, per gram atom of halogen, but the amount utilized will depend upon the activity of the adjuvant. There is considerable variation in activity and in some instances too large a quantity of the halogen adjuvant destroys the initiator. In such cases only small amounts of adjuvant should be used, while in other cases satisfactory results can be obtained with larger amounts.

The organolithium compounds that can be employed in this invention contain from 2 to 4 lithium atoms per molecule. These organolithium compounds can be prepared in a hydrocarbon or polar medium in several ways, for example, by replacing halogen in an organic halide with lithium or by the direct addition of lithium to a double bond or by reacting an organic halide with a lithium-containing compound.

The compounds from which the organolithium initiators for all aspects of the invention are prepared are pol-cyclic aromatics, halogen derivatives of polycyclic aromatics containing from 2 to 4 halogen atoms per molecule, polyaryl-substituted ethylenes, and bihalogen-containing, i.e. 1,2-dihalo, polyaryl-substituted ethanes and generally contain from 10 to 30, inclusive, carbon atoms per molecule. When the parent compound is a polycyclic aromatic compound, it can contain alkyl substituents which substituents can themselves contain from 1 to 6 carbon atoms. The total number of carbon atoms in each alkyl substituent group should not exceed 6 and no more than 3 alkyl groups should be present per molecule.

Organolithium compounds which are applicable in this invention include both substitution products and adducts. Substitution products can be prepared by halogen-lithium interconversion and halogen displacement, e.g. the reaction of dichloronaphthalene with elemental lithium or with butyllithium to produce a dilithionaphthalene. Adducts are prepared by the reaction of lithium with the appropriate hydrocarbon wherein the reaction occurs by 1,2- or 1,4-addition, depending upon the hydrocarbon employed. Reactions of this type are illustrated by the addition of lithium to naphthalene or to the double bond in stilbene.

As indicated above, polylithium substitution products can be obtained by the reaction of lithium or an organo-lithium compound, preferably an alkyl lithium where the alkyl radical contains from 1 to 6 carbon atoms, inclusive, with a polycyclic aromatic compound containing 2 to 4 halogen atoms per molecule including condensed ring aromatics and polyphenyls. Representative examples of such initiators include 4,4' - dilithiobiphenyl, 2,2',2" - trilithio-p-terphenyl, 1,4-dilithionaphthalene, 1,5-dilithionaphthalene, 9,10-dilithioanthracene, 9,10-dilithiophenanthrene, 5,6-dilithioacenaphthene, 2,4-dilithio-5,7-diisopropylphenanthrene 1,4 - dilithioanthracene 1,4,5,8-tetralithionaphthalene, and 1,4-dilithio-2-methylnaphthalene.

Polylithium substitution products can also be obtained from the reaction of lithium with bihalogen-containing polyaryl-substituted ethanes wherein the examples of such initiators include 1,2-dilithio-1,2-diphenylethane, 1,2-dilithio-1,1-diphenylethane, 1,2-dilithiotetraphenylethane, 1,2 - dilithio - 1 - phenyl-2-(1-naphthyl)ethane, and 1,2-dilithio-1,2-di(2-naphthyl)ethane.

The organolithium initiators employed in carrying out the present invention can also be adducts, which are the reaction products of lithium with polycyclic aromatic hydrocarbons or polyaryl-substituted ethylenes. The polycyclic aromatic compounds than can be reacted with lithium preferably include condensed ring aromatic compounds such as naphthalene, anthracene and phenanthrene; alkylsubstituted condensed ring aromatics in which the alkyl group contains from 1 to 6 carbon atoms such as 1-methylnaphthalene, 2-methylnaphthalene, 1-ethylnaphthalene, 1-n-propylnaphthalene, 1-tert-butylnaphthalene, 2-amylnaphthalene, 2,4-di-n-propylnaphthalene, 9-methylanthracene, 1 - ethylanthracene, 1,4,5 - triethylanthracene, 2,7 - dimethylphenanthrene, and the like, and mixtures of these compounds. The polyaryl-substituted ethylene that can be employed include those compounds which contain 2, 3, or 4 aryl groups such as phenyl and/or naphthyl, for example 1,1-diphenylethylene, 1,2-diphenylethylene (stilbene), triphenylethylene, tetraphenylethylene, 1-phenyl-1-naphthylethylene, 1, 2 - dinaphthylene, 1,1 - diphenyl-2-naphthylethylene, trinaphthylethylene and the like. Other polycyclic aromatics such as biphenyls, terphenyls and dinaphthyl can also be used.

The lithium employed for preparing the initiators can be used in any form desired, such as wire, chunks or shot, or in a finely divided state. It is preferred that at least equimolar proportions of lithium be used in preparing the initiator reaction products and in many instances an excess of lithium is employed.

The above-described initiators can be conveniently prepared in any manner known in the art. In some instances it is advantageous to react lithium with mixtures of hydrocarbons, e.g., a mixture of naphthalene and anthracene in ether, to facilitate the reaction. Frequently, the initiator is formed in a polar solvent or other organic media. In the interest of obtaining a polymer with as high a cis content as possible, it is preferred that any polar solvent employed in the preparation of the initiator be substantially completely replaced with a suitable hydrocarbon, e.g., a high boiling hydrocarbon such as a mineral oil, before polymerization. Also, it is preferred that the initiator be prepared and that the polymerization be carried out in the presence of an inert atmosphere, such as argon, helium, nitrogen, and the like.

The initiators of this invention are of particular interest for the production of high cis polyisoprene. The polyisoprene obtained according to this invention has a raw cis content above 65 percent and generally above 70 percent.

The temperature employed for polymerization according to the invention is generally in the range —100 to 150° C., preferably from —75 to 75° C. The particular temperature employed depends on both the monomer and initiator used in the polymerizaiton. The pressure employed during polymerization need be only that necessary to maintain the material substantially completely in a liquid phase. The amount of initiator employed during polymerization will vary appreciably, but generally it will be in the range of from about 0.1 to about 200 gram atoms of lithium per 100 grams of monomer with the preferred range being from about 0.25 to about 60 gram atoms of lithium per 100 grams of monomer.

The polymerization of monomer in the presence of the halogen adjuvant and organolithium initiators according to the invention is preferably carried out in a suitable diluent such as benzene, toluene, cyclohexane, methylcyclohexane, xylene, n-butane, n-hexane, n-pentane, n-heptane, isooctane, and the like. Generally, the diluent is selected from hydrocarbons, for example, paraffins, cycloparaffins, and aromatics containing from 4 to 10, inclusive, carbon atoms per molecule.

There can be numerous variations in operating procedure when carrying out the polymerization in accordance with the present process. The halogen adjuvant can be charged to the system as a separate ingredient either as such or in solution in a solvent which will not have a deleterious effect on the polymerization. If desired, the adjuvant can be charged to the polymerization as part of the initiator. If the initiator is prepared in a polar solvent, the halogen adjuvant can be added to the solution and the polar solvent then replaced with a suitable hydrocarbon diluent, or the halogen adjuvant can be incorporated into the initiator following replacement with a suitable hydrocarbon diluent.

One of the requirements for the successful polymerization of isoprene in accordance with known processes is that the monomer be of high degree of purity. An advantage of the present process is that it is not essential that olefinic impurities be removed. It has been found, in fact, that excellent results can be achieved by using an isoprene containing stream as found in the isoamylene effluent from a dehydrogenation operation. The economic advantage of such a process is obvious and the time and cost saved which would ordinarily be required for separation and purification of the isoprene is significant. As is well known, commercially produced isoprene ordinarily contains minor amounts, for example, up to 10 percent, of olefinic hydrocarbons, and it is intended that the polymerization of these commercial isoprene-containing streams are included within the scope of the invention.

The high cis-polyisoprene products obtained according to the invention can range from liquids to rubbery materials. The unquenched polymer solutions can be treated with various reagents to introduce functional groups replacing the terminal lithium atoms on the polymer molecules resulting from the polymerization itself. For example, polymer in solution can be contacted with carbon dioxide to replace the lithium atoms with —COOH groups. Other functional groups which can be introduced include —SH, —OH, halogen and the like. Alternatively, the unquenched polymer solutions can be treated with an alcohol or other reagent to inactivate the catalyst or initiator and/or precipitate polymer, which is recovered without functional groups.

The rubbery cis-polyisoprene produced in accordance with this invention can be compounded by any of the known methods such as have been used in the past for compounding rubbers. Vulcanizing agents, vulcanization accelerators, accelerator activators, reinforcing agents, antioxidants, softeners, or plasticizers, and fillers and other compounding ingredients, such as have been normally employed in rubbers can likewise be used in the polymers of this invention. The rubbery diene polymers have utility in applications where both natural and synthetic rubbers are used. For example, they can be used in the manufacture of automobile tires, gaskets, and other rubber articles.

EXAMPLE I

A polymerization initiator was prepared by reacting lithium wire with methylnaphthalene (a 60/40 mixture of alpha- and beta-methylnaphthalenes) in the presence of diethyl ether. The follwing recipe was employed:

| | |
|---|---|
| Methylnaphthalene, mole | 1.0 |
| Lithium wire, gram atoms | 3.0 |
| Diethyl ether, moles | 4.5 |
| Temperature, °F. | −15 |
| Time, hours | 19 |
| Molarity [1] | 1.63 |

[1] Determined by withdrawing a portion of the reaction mixture and titrating it with 0.1 NHCl.

Ether was removed from the reaction mixture by dropping it into refined mineral oil (U.S.P. Heavy White Mineral Oil) that had been heated to 100° C. and purged with nitrogen. Thirty milliliters of the ether-containing reaction mixture was used per 125 milliliters of mineral oil. The temperature was maintained at 100° C. for one hour while agitating the mixture and passing nitrogen through it. After allowing it to cool to room temperature, it was diluted with 125 milliliters of n-pentane. The resulting mixture had a molarity of 0.165.

Variable quantities of n-butyl bromide were used in the polymerization of isoprene in the presence of the foregoing initiator dispersion. The recipe was as follows:

| | |
|---|---|
| Isoprene, parts by weight | 100 |
| n-Pentane, parts by weight | 1000 |
| Initiator, mhm.[1] | 2.5 |
| n-Butyl bromide, mhm.[1] | variable |
| Temperature, °F. | 122 |
| Time, hours | 24 |

[1] Millimoles per 100 grams monomer.

Pentane was charged first, the reactor was purged with nitrogen, isoprene was added, and then the initiator. When butyl bromide was used, it was added last. In Table I above are the results of a series of runs:

The data show that butyl bromide functioned as a modifier and as the amount was increased, the inherent viscosity decreased. The polymers prepared in the presence of butyl bromide had a higher cis content and lower 3,4-addition than the control.

EXAMPLE II

The initiator described in Example I was employed for the polymerization of isoprene in accordance with the following recipe:

| | |
|---|---|
| Isoprene, parts by weight | 100 |
| n-Pentane, parts by weight | 1000 |
| Initiator, mhm. | 1.75 |
| n-Butyl bromide, mhm. | 0.87 |
| Temperature, °F. | 122 |
| Time, hours | 21 |
| Conversion, percent | 100 |
| Microstructure, percent: | |
| cis, normalized | 90.3 |
| 3,4-addition, normalized | 9.7 |
| Inherent viscosity (A) | 5.71 |
| Gel, percent (B) | 0 |
| ML-4 at 212° F. (C) | 71.4 |

(A), (B), (C)—See notes at end of specification.

The polymer was compounded in a tread stock recipe using two different accelerator levels. A control was run using a blend of four polymers prepared in the presence of a lithium-methylnaphthalene initiator but with no butyl bromide in the system. This polymer blend had a raw Mooney value (ML-4 at 212° F.) of 51, normalized cis content of 88.6 percent, and raw 3,4-addition of 8.0 percent. All stocks were mixed, prior to addition of curatives, in a Midget Banbury for 6 minutes at 250° F. and then for 5 minutes at 290° F. Observations were made on processing properties after which curatives were added, stocks cured, and physical properties determined. Data are shown in the following table:

TABLE I

| Run No. | n-$C_4H_9$Br, mhm. | Li/$C_4H_9$Br, mol ratio | Conv., percent | Cis, percent normalized | 3,4-addition, percent normalized | Inh. (A) Vis. | Gel, (B) percent |
|---|---|---|---|---|---|---|---|
| 1 | 0.63 | 8/1 | 100 | 90.4 | 9.6 | 4.46 | 0 |
| 2 | 1.25 | 4/1 | 100 | 89.9 | 10.1 | 3.59 | 0 |
| 3 | 1.88 | 2.7/1 | 100 | 89.2 | 10.8 | 3.11 | 0 |
| 4 | 2.5 | 2/1 | 100 | 89.4 | 10.6 | 2.77 | 0 |
| 5 (control) | | | 100 | 88.6 | 11.4 | 4.60 | 0 |

(A), (B)—See notes at end of specification.

TABLE II

Compounding Recipes, Parts by Weight

| | A | B | Control |
|---|---|---|---|
| Rubber | 100 | 100 | 100 |
| High abrasion furnace black | 50 | 50 | 50 |
| Zinc oxide | 3 | 3 | 3 |
| Stearic acid | 3 | 3 | 3 |
| Flexamine [1] | 1 | 1 | 1 |
| Philrich 5 [2] | 5 | 5 | 5 |
| Pepton 22 [3] | 1 | 1 | 1 |
| Sulfur | 2.25 | 2.25 | 2.25 |
| NOBS Special [4] | 0.5 | 0.7 | 0.5 |

Processing Properties

| | A | B | Control |
|---|---|---|---|
| Compounded MS-1½ at 212° F. | 25.5 | | 27.0 |
| Extrusion at 195° F.: | | | |
| Inches/minute | 55.8 | | 57.0 |
| Grams/minute | 114.2 | | 115.2 |
| Rating (Garvey die) | 12− | | 12− |
| Mill banding | Good | | Good |

Physical Properties, 45 Minutes Cure at 292° F.

| | A | B | Control |
|---|---|---|---|
| $\nu \times 10^4$, mols/cc. (D) | 1.51 | 1.68 | 1.51 |
| 300%, Modulus, p.s.i. | 1,260 | 1,460 | 1,100 |
| Tensile, p.s.i.[5] | 3,430 | 3,535 | 3,300 |
| Elongation, percent [6] | 610 | 570 | 660 |
| Max. tensile at 200° F. | 1,956 | 2,000 | 1,845 |
| ΔT, °F. (F) | 43.3 | 40.5 | 42.6 |
| Resilience, percent (G) | 68.9 | 68.8 | 67.1 |
| Shore A hardness (H) | 57.5 | 59.5 | 58.0 |

Oven Aged 24 Hours at 212° F.

| | A | B | Control |
|---|---|---|---|
| 300%, Modulus, p.s.i. (E) | 1,525 | 1,770 | 1,440 |
| Tensile, p.s.i. (E) | 2,000 | 1,965 | 1,610 |
| Elongation, percent (E) | 380 | 320 | 345 |
| ΔT, °F. (F) | 45.3 | 40.5 | 45.3 |
| Resilience, percent (G) | 68.7 | 69.9 | 67.3 |
| Shore A hardness (H) | 61.5 | 63.0 | 62.0 |

[1] Physical mixture containing 65 percent of a complex diarylamine-ketone reaction product and 35 percent of N,N'-diphenyl-p-phenylenediamine.
[2] Aromatic oil.
[3] 2,2'-dibenzamidodiphenyl disulfide.
[4] N-oxydiethylene-2-benzothiazyl sulfenamide.
[5] 30-minute cures.
[6] Stocks mixed 6 minutes in Midget Banbury at 250° F. and cured.
(D), (E), (F), (G), (H)—See notes at end of specification.

The data show that the polymers modified with butyl bromide had a better balance of properties than the control. Even though the butyl bromide modified polymer had a much higher Mooney value than the control, it was equivalent in processability.

EXAMPLE III

Lithium was reacted with methylnaphthalene in diethyl ether and the polar solvent was then replaced with mineral oil in a manner similar to that described in Example I. This initiator was used for the polymerization of isoprene. Two runs were made. n-Butyl bromide was used in one of the runs. The following polymerization recipes were employed:

|  | A | B |
|---|---|---|
| Isoprene, parts by weight | 100 | 100 |
| n-Pentane, parts by weight | 1,000 | 1,000 |
| Initiator, mhm | 0.9 | 1.2 |
| n-Butyl bromide, mhm | | 0.6 |
| Temperature, °F | 122 | 122 |
| Time, hours | 26 | 26 |
| Conversion, percent | 100 | 100 |
| ML-4 at 212° F. (C) | 54.0 | 64.0 |
| Inherent viscosity (A) | 5.99 | 4.37 |
| Gel, percent (B) | trace | 0 |
| Microstructure, percent— | | |
| Cis: | | |
| Raw | 76.6 | 81.2 |
| Normalized | 89.9 | 91.1 |
| 3,4-addition: | | |
| Raw | 8.6 | 7.9 |
| Normalized | 10.1 | 8.9 |

(A), (B), (C)—See notes at end of specification.

In these runs pentane was charged first, the reactor was purged with nitrogen, isoprene was added, and then the initiator. The butyl bromide used in Run B was charged last in pentane solution.

The polymers were compounded in a treat stock recipe, mixed in a Midget Banbury for 6 minutes at 250° F. and then for 5 minutes at 290° F. The stocks were cured and physical properties determined. A summary of the data is shown in the following table:

TABLE III

Compounding Recipe, Parts by Weight

|  | A (Control) | B |
|---|---|---|
| Rubber | 100 | 100 |
| High abrasion furnace black | 50 | 50 |
| Zinc oxide | 3 | 3 |
| Stearic acid | 3 | 3 |
| Flexamine | 1 | 1 |
| Philrich 5 | 5 | 5 |
| Pepton 22 | 1 | 1 |
| Sulfur | 2.25 | 2.25 |
| NOBS Special | 0.5 | 0.5 |

Processing Properties

|  | A (Control) | B |
|---|---|---|
| Compounded MS-1½ at 212° F | 33.0 | 31.5 |
| Extrusion at 195° F.: | | |
| Inches/minute | 58.8 | 59.2 |
| Grams/minute | 113.0 | 118.0 |
| Rating (Garvey die) | 9+ | 11 |
| Mill banding | Good | Good |

Physical Properties, 45 Minutes Cure at 292° F.

|  | A (Control) | B |
|---|---|---|
| $\nu \times 10^4$, mols/cc. (D) | 1.56 | 1.53 |
| 300% Modulus, p.s.i. (E) | 1,200 | 1,230 |
| Tensile, p.s.i. (E) | 2,740 | 3,270 |
| Elongation, percent (E) | 530 | 560 |
| Max. tensile at 200° F., p.s.i. | 1,750 | 2,110 |
| ΔT, °F. (F) | 39.9 | 42.9 |
| Resilience, percent (G) | 71.6 | 69.6 |
| Shore A hardness (H) | 56.5 | 57.5 |

Oven Aged 24 Hours at 212° F.

|  | A (Control) | B |
|---|---|---|
| 300% Modulus, p.s.i. (E) | 925 | 1,110 |
| Tensile, p.s.i. (E) | 1,050 | 1,225 |
| Elongation, percent (E) | 325 | 320 |
| ΔT, °F. (F) | 43.9 | 46.3 |
| Resilience, percent (G) | 71.1 | 69.8 |
| Shore hardness | 57.5 | 59.0 |

(D), (E), (F), (G), (H)—See notes at end of specification.

The data show that the polymer prepared in the presence of butyl bromide had a higher cis content and better processing properties even though it had the higher raw Mooney value. The cured stock also had a better balance of properties than the polymer prepared in the absence of butyl bromide.

EXAMPLE IV

An isoamylene dehydrogenation effluent containing 11 weight percent isoprene was employed in a series of polymerization runs using 2.2 mhm. of the lithium-methylnaphthalene initiator of Example III and 1.1 mhm. of n-butyl bromide. The isoamylene dehydrogenation effluent furnished both the monomer and solvent. The isoamylene effluent had the following analysis:

TABLE IV.—EFFLUENT ANALYSIS

| Component: | Weight, percent |
|---|---|
| Isopentane | 0.5 |
| n-Pentane | 0.5 |
| 3-methylbutene-1 | 0.4 |
| 2-methylbutene-1 | 32.0 |
| 2-methylbutene-2 | 55.6 |
| Isoprene | 11.0 |
| Trans-piperylene | 0.08 |
| Cis-piperylene | 0.01 |
| Cyclopentadiene | * 10 |
| α-Acetylenes | * 20 |

* P.p.m.

Polymerization temperature was 122° F. Products from several runs were blended to give a polymer having a raw Mooney value (ML-4 at 212° F.) of 64.1, an inherent viscosity of 5.42, normalized cis content of 88.3 percent, and normalized 3,4-addition content of 11.7 percent.

This polymer was compounded and milled as in Example III. It banded well on the mill, had a Garvey die extrusion rating of 12, and other good processing properties. The compounded stock was cured 45 minutes at 292° F. and physical properties determined. Results were as follows:

| | |
|---|---|
| $\nu \times 10^4$, mols/cc. (D) | 1.43 |
| 300% modulus, p.s.i. | 1100 |
| Tensile, p.s.i. (E) | 3160 |
| Elongation, percent (E) | 590 |
| Max. tensile at 200° F., p.s.i. | 1725 |
| ΔT, °F. (F) | 46.6 |
| Resilience, percent (G) | 67.4 |
| Shore A hardness (H) | 56.5 |
| Oven aged 24 hours at 212° F.: | |
| 300% modulus, p.s.i. (E) | 1145 |
| Tensile, p.s.i. (E) | 1375 |
| Elongation, p.s.i. (E) | 350 |
| ΔT, °F. (F) | 50.0 |
| Resilience, percent (G) | 67.3 |
| Shore A hardness (H) | 57.5 |

(D), (E), (F), (G), (H)—See notes at end of specification.

These data show that the present invention is applicable for the polymerization of isoprene contained in isoamylene dehydrogenation effluent and that a polymer having a high cis content, good processing properties, and good physical properties can be obtained when operating in this manner.

EXAMPLE V

The initiator of Example III was employed for the polymerization of isoprene. Hydrogen bromide was present in the system. Two runs were made in accordance with the following recipe:

| | |
|---|---|
| Isoprene, parts by weight | 100 |
| n-Pentane, parts by weight | 1000 |
| Initiator, mhm. | variable |
| Hydrogen bromide, mhm. | variable |
| Temperature, °F. | 122 |
| Time, hours | 24 |

Pentane was charged first, the reactor was purged with nitrogen, isoprene and the initiator were added in that order, and hydrogen bromide was introduced as a gas. Following are the results of the runs:

| Run No. | Initiator, mhm. | HBr, mhm. | Li/HBr, mol ratio | Conv., percent | Cis, percent Raw | Cis, percent Normalized | 3,4-addition, percent Raw | 3,4-addition, percent Normalized | Inh. (A) Visc. | Gel (B) percent |
|---|---|---|---|---|---|---|---|---|---|---|
| 1 | 1.0 | 0.5 | 4/1 | 85 | 84.2 | 91.7 | 7.6 | 8.3 | 5.28 | 0 |
| 2 | 1.6 | 0.8 | 4/1 | 100 | 75.0 | 89.7 | 8.6 | 10.3 | 5.38 | 0 |

(A), (B)—See notes at end of specification.

EXAMPLE VI

A lithium-methylnaphthalene reaction product was prepared in diethyl ether and this solvent was then replaced with mineral oil in a manner similar to that described in Example I. This initiator was used for the polymerization of isoprene using 100 parts by weight of the monomer, 1000 parts by weight of n-pentane, and 1.5 mhm. of initiator. Polymerization was effected at 122° F. for 24 hours. Two runs were made. One was used as a control and 2.0 mhm. of bromobenzene was added last to the other run. Quantitative conversion was obtained in both runs. The following data show that a polymer of higher cis content is obtained when bromobenzene is present:

| Run No. | Initiator, mhm. | Bromobenzene, mhm. | Li/Br, mol ratio | Cis, percent normalized | 3,4-addition, percent normalized |
|---|---|---|---|---|---|
| 1 | 1.5 | 2.0 | 1.5/1 | 90.4 | 9.6 |
| 2 | 1.5 | | | 89.7 | 10.3 |

EXAMPLE VII

Three halides, n-hexyl fluoride, n-butyl chloride and n-butyl bromide were employed in a series of runs for the polymerization of isoprene using the same quantities of monomer and pentane employed in Example VI and the same initiator. Polymerization temperature was 122° F. and the time was 24 hours. The initiator level was 2 mhm. A control run was made in which no halogen adjuvant was present. All reactions reached quantitative conversion and the polymers were gel free. The following results were obtained:

| Run No. | Halide Type | Halide Mhm. | Li/Halide, mol ratio | Cis, percent normalized | 3,4-addition, percent normalized | Inherent (A) viscosity |
|---|---|---|---|---|---|---|
| 1 | n-Hexyl F | 2.0 | 2/1 | 90.5 | 9.5 | 4.75 |
| 2 | do | 1.0 | 4/1 | 89.0 | 11.0 | 5.24 |
| 3 | do | 0.67 | 6/1 | 89.6 | 10.4 | 5.60 |
| 4 | n-Butyl Cl | 2.0 | 2/1 | 89.8 | 10.2 | 6.01 |
| 5 | n-Butyl Br | 1.33 | 3/1 | 89.6 | 10.4 | 4.33 |
| 6 | do | 1.0 | 4/1 | 90.0 | 10.0 | 4.67 |
| 7 | do | 0.67 | 6/1 | 90.7 | 9.3 | 5.11 |
| 8 | | | | 89.7 | 10.3 | 6.08 |

(A)—See notes at end of specification.

These data show that the polymers prepared in the presence of a halogen adjuvant had lower inherent viscosities than the control and in general the cis content was higher.

EXAMPLE VIII

A lithium-methylnaphthalene reaction product in mineral oil was prepared as described in Example I (molarity, 0.165). To each of three bottles was added 48.5 milliliters (8 millimoles) of the mineral oil dispersion. Anhydrous hydrogen chloride gas was added to one bottle, isobutyl iodide to the second bottle, and iodine dissolved in n-pentane to the third. Addition of each of the halogen-containing reagents required about 5 minutes. The following table shows quantities of the reagents and molar of each dispersion:

| Initiator | Reagent Added Type | Reagent Added Mmoles | Molarity |
|---|---|---|---|
| 2 | HCl gas | 4.0 | 0.13 |
| 3 | Isobutyl iodide | 4.0 | 0.13 |
| 4 | Iodine | 2.0 | 0.10 |

Each of the above-described products was used as an initiator for the polymerization of isoprene. The amounts of isoprene and n-pentane were the same as in Example I. Polymerization temperature was 122° F. and reaction time was 41 hours. In each case quantitative conversion was reached and all polymers were gel free. Results are summarized in the following table:

| Run No. | Initiator No. | Initiator Mhm. | Cis, percent Raw | Cis, percent Normalized | 3,4-addition, percent Raw | 3,4-addition, percent Normalized | Inherent (A) Viscosity |
|---|---|---|---|---|---|---|---|
| 1 | 2 | 2.50 | 81.2 | 90.4 | 8.6 | 9.6 | 4.22 |
| 2 | 3 | 2.00 | 73.5 | 87.8 | 10.4 | 12.4 | 2.32 |
| 3 | 4 | 2.25 | 82.7 | 90.0 | 9.2 | 10.0 | 4.32 |

These data show that good results can be obtained if the halogen-containing reagent is added to the organolithium initiator prior to charging it to the polymerization system.

EXAMPLE IX

Lithium wire was reacted with methylnaphthalene using the proportions of ingredients given in Example I. The reaction was effected at −15° F. for 18 hours. Molarity of the reaction mixture determined by 0.1 N hydrochloric acid titration was 1.80.

Twenty-seven millimoles of n-butyl bromide was added to 15 milliliters of the lithium-methylnaphthalene reaction mixture at 0° C. The temperature was maintained at 41° F. (5° C.) for 1 hour after which ether was removed by adding the mixture to 100 milliliters of refined mineral oil (U.S.P. Heavy White Mineral Oil) which had been heated to 100° C. and purged with nitrogen. The temperature was maintained at 100° C. for 1 hour while agitating the mixture and passing nitrogen through it. It was then allowed to cool to room temperature. The molarity was 0.085.

The foregoing initiator was used for the polymerization of isoprene in n-pentane. The quantities of isoprene and n-pentane were the same as in Example I. The initiator level was 5.0 mhm. Polymerization was effected at 122° F. and quantitative conversion was reached after 22 hours. The product had an inherent viscosity of 3.25(A), raw cis content of 80.4 percent (normalized, 89.4), and raw 3,4-addition of 9.6 percent (normalized, 10.6).

EXAMPLE X

Dilithium dihydroanthracene was prepared by reacting 0.11 mol of n-butyllithium with 0.5 mol of dihydroanthracene in 100 milliliters of toluene. The mixture was placed in a bath at 50° C. and tumbled for 144 hours. The reaction was effected in a nitrogen atmosphere. A solid product formed which was separated by centrifuging the mixture. It was washed with 50 milliliters of toluene and followed by two washings with n-pentane, each time centrifuging and decanting the liquid. Unreacted butyllithium was removed by the washing steps. The solid product was finally dispersed in 100 milliliters of n-pentane. The dispersion had a molarity of 0.36.

The above-described dilithium dihydroanthracene was employed as the initiator in two runs for the polymerization of isoprene. n-Butyl bromide was used in one run. Recipes and data are shown below:

|  | Run A | Run B |
|---|---|---|
| Isoprene, parts by weight | 100 | 100 |
| n-Pentane, parts by weight | 1,000 | 1,000 |
| Initiator, mhm | 5 | 5 |
| n-Butyl bromide, mhm | 0.5 | |
| Temperature, ° F | 122 | 122 |
| Time, hours | 18 | 72 |
| Conversion, percent | 100 | 100 |
| Inherent Viscosity (A) | 5.02 | 6.53 |
| Microstructure, percent: | | |
| Cis, | | |
| Raw | 90.04 | 90.4 |
| Normalized | 92.1 | 91.1 |
| 3,4-addition, | | |
| Raw | 7.8 | 8.8 |
| Normalized | 7.9 | 8.9 |

(A)—See notes at end of specification.

The run in which butyl bromide was used gave a polymer with a lower inherent viscosity and a slightly higher cis content than the control run.

EXAMPLE XI

Runs were made at 122° F. to determine the effect of butyl bromide and bromobenzene as halogen adjuvants when polymerizing isoprene in the presence of butyllithium. The polymerization recipe was as follows:

| | |
|---|---|
| Isoprene, parts by weight | 100 |
| n-Pentane, parts by weight | 1000 |
| n-Butyllithium, mhm | 1.5 to 2.0 |
| Halogen adjuvant, mhm | variable |

The diluent was charged first and the reactor was purged with nitrogen after which the butyllithium and the halogen adjuvant were added. The temperature was adjusted to 122° F. and maintained at this level for variable periods before addition of the isoprene. At the conclusion of each polymerization, approximately one part by weight per 100 parts by weight of polymer of 2,2′-methylene-bis(4-methyl-6-tert-butylphenol) was added. The polymer was coagulated in isopropyl alcohol and dried overnight in a vacuum oven. Results were as follows:

| Run No. | BuLi, mhm. | Halogen Adjuvant | | Hours at 122° F. Before Adding Isoprene | Polymerization Time, hours | Conv., percent | Microstructure, percent | | Inherent Viscosity |
|---|---|---|---|---|---|---|---|---|---|
| | | Type | Mhm. | | | | Cis | 3,4-addition | |
| 1 | 2.0 | | 0 | 0 | 24.9 | 97 | 73.5 | 10.2 | 1.44 |
| 2 | 2.0 | BuBr | 1.0 | 1.0 | 23.9 | 96 | 72.0 | 10.3 | 1.98 |
| 3 | 2.0 | BuBr | 1.0 | 2.0 | 22.9 | 97 | 72.0 | 9.8 | 2.40 |
| 4 | 2.0 | BuBr | 1.0 | 5.0 | 19.9 | 95 | 72.0 | 9.4 | 2.31 |
| 5 | 2.0 | BuBr | 0.5 | 1.0 | 23.9 | 98 | 72.0 | 10.2 | 2.42 |
| 6 | 2.0 | BuBr | 0.5 | 2.0 | 22.9 | 99 | 72.0 | 10.3 | 2.18 |
| 7 | 2.0 | BuBr | 0.5 | 5.0 | 19.9 | 91 | 78.1 | 9.0 | 3.18 |
| 8 | 1.5 | | 0 | 1.1 | 15 | 99 | 72.0 | 11.3 | 1.72 |
| 9 | 1.5 | BuBr | 3.0 | 1.1 | 15 | 100 | 73.5 | 10.6 | 2.31 |
| 10 | 1.5 | BuBr | 1.5 | 1.1 | 15 | 98 | 75.0 | 10.9 | 2.07 |
| 11 | 1.5 | φBr | 4.0 | 1.1 | 15 | 100 | 75.0 | 10.8 | 2.05 |
| 12 | 1.5 | φBr | 2.0 | 1.1 | 15 | 100 | 72.0 | 10.8 | 1.92 |

These data show that inherent viscosity of the polyisoprene increased in the presence of the halogen adjuvant when the butyllithium initiator was employed, this indicating that no modification occurs with an alkyllithium initiator.

Microstructures in the above examples were determined using a commercial infrared spectrometer. The samples were dissolved in carbon disulfide so as to form a solution containing 25 grams of polymer per liter of solution. Calibrations were based on deproteinized natural rubber as a reference material assuming that it contained 98 percent cis and 2 percent 3,4-addition product. The cis was measured at the 8.9 micron band and 3,4-addition at the 11.25 micron band. In the presence of a high cis polyisoprene, trans is not detectable, since trans is measured at the 8.75 micron band. The raw cis and raw 3,4-addition are converted to normalized values (assuming cis+3,4-addition=100) as follows:

$$\frac{\text{raw cis percent}}{\text{Raw cis percent} + \text{raw 3,4-addition, percent}}(100) = \text{normalized cis percent}$$

$$\frac{\text{raw 3,4-addition percent}}{\text{Raw cis percent} + \text{raw 3,4-Addition, percent}}(100) = \text{normalized 3,4-addition percent}$$

NOTES (A) One-tenth gram of polymer was placed in a wire cage made from 80 mesh screen and the cage was placed in 100 ml. of toluene contained in a wide-mouth, 4-ounce bottle. After standing at room temperature (approximately 77° F.) for 24 hours, the cage was removed and the solution was filtered through a sulfur absorption tube of grade C porosity to remove any solid particles present. The resulting solution was run through a Medalia-type viscometer supported in a 77° F. bath. The viscometer was previously calibrated with toluene. The relative viscosity is the ratio of the viscosity of the polymer solution to that of toluene. The inherent viscosity is calculated by dividing the natural logarithm of the relative viscosity by the weight of the original sample.

(B) Determination of gel was made along with the inherent viscosity determination. The wire cage was calibrated for toluene retention in order to correct the weight of swelled gel and to determine accurately the weight of dry gel. The empty cage was immersed in toluene and then allowed to drain three minutes in a closed widemouth, two-ounce bottle. A piece of folded quarter-inch hardware cloth in the bottom of the bottle supported the cage with minimum contact. The bottle containing the cage was weighed to the nearest 0.02 gram during a minimum three-minute draining period after which the cage was withdrawn and the bottle again weighed to the nearest 0.02 gram. The difference in the two weighings is the weight of the cage plus the toluene retained by it, and by subtracting the weight of the empty cage from this value, the weight of toluene retention is found, i.e., the cage calibration. In the gel determination, after the cage containing the sample had stood for 24 hours in toluene, the cage was withdrawn from the bottle with the aid of forceps and placed in the two-ounce bottle. The same procedure was followed for determining the weight of swelled gel as was used for calibration of the cage. The weight of swelled gel was corrected by subtracting the cage calibration.

(C) ASTM D927-55T (recently changed to D-1646-61).

(D) Swelling method of Kraus, Rubber World 135 (1956), 67-73, 254-260. This value is the number of network chains per unit volume of rubber. The higher the number, the more the rubber is crosslinked.

(E) ASTM D412-51T (recently changed to D412-61T). Scott Tensile Machine L-6. Tests made at 80° F.

(F) ASTM D623-58. Method A. Goodrich Flexometer, 143 lbs./sq. in. load, 0.175 inch stroke. Test specimen is a right circular cylinder 0.7 inch in diameter and one inch high.

(G) ASTM D945-55 (modified) (recently changed to D-945-59). Yerzley Oscillograph. Test specimen is a right circular cylinder 0.7 inch in diameter and one inch high.

(H) ASTM D676-55T (recently changed to D-1706-61). Shore Durometer, Type A.

Reasonable variations and modifications of this invention can be made or followed in view of the foregoing without departing from the spirit and scope thereof.

I claim:

1. A process for producing a high cis polyisoprene of improved processability characteristics which comprises contacting isoprene under polymerization conditions of $-100$ to $150°$ C. and a pressure sufficient to maintain substantially complete liquid phase conditions with an initiator in the presence of a halogen adjuvant selected from the group consisting of RX, HX, and $X_2$ wherein X is halogen and when X is one of Cl, Br, I, R is a radical selected from the group consisting of saturated aliphatic, saturated cycloaliphatic, and aromatic radicals and when X is F, R is a radical selected from the group consisting of saturated aliphatic and saturated cycloaliphatic radicals, when the halogen adjuvant is one of HX and $X_2$ said halogen adjuvant being present in an amount sufficient to lower the inherent viscosity of the final polymer without destroying the initiator, the initiator is that formed by reacting lithium with a material selected from the group consisting of polycyclic aromatic compounds, halogen derivatives of polycyclic aromatics containing from 2 to 4 halogen atoms per molecule, and polyaryl-substituted ethylenes containing from 2 to 4 aryl groups selected from the group consisting of phenyl and naphthyl, and when the halogen adjuvant is RX the initiator is formed by reacting a material selected from the group consisting of lithium and organolithium compounds with a material selected from the group consisting of polycyclic aromatics, halogen derivatives of polycyclic aromatics containing from 2 to 4 halogen atoms per molecule, polyaryl substituted ethylene, and bihalogen-containing aryl-substituted ethanes containing from 2 to 4 aryl groups selected from the group consisting of phenyl and naphthyl.

2. In a process for the polymerization of isoprene under polymerization conditions of $-100$ to $150°$ C. and a pressure sufficient to maintain substantially complete liquid phase conditions, the improvement which comprises carrying out the polymerization in the presence of an initiator formed by reacting a material selected from the group consisting of lithium and organolithium compounds with a material selected from the group consisting of polycyclic aromatic compounds, halogen derivatives of polycyclic aromatics containing from 2 to 4 halogen atoms per molecule, polyaryl-substituted ethylene, and bihalogen-containing polyaryl-substituted ethanes containing from 2 to 4 aryl groups selected from the group consisting of phenyl and naphthyl and in the presence of a halogen adjuvant comprising an organic halide compound wherein the organo radical is selected from the group consisting of saturated alphatic, saturatde cycloaliphatic and aromatic radicals, said halogen adjuvant being present in an amount sufficient to lower the inherent viscosity of the final polymer without destroying the initiator.

3. A process for producing high cis polyisoprene of improved processability characteristics which comprises contacting isoprene under polymerization conditions of $-100$ to $150°$ C. and a pressure sufficient to maintain substantially complete liquid phase conditions with an active initiator formed by reacting a material selected from the group consisting of lithium and alkyl lithium compounds wherein the alkyl radical contains from 1 to 6 carbon atoms, inclusive, with a material selected from the group consisting of polycyclic aromatic compounds, polyaryl-substituted ethylene and bihalogen-containing polyaryl-substituted ethanes wherein the two halogen substituents are on the aliphatic carbon atoms, said material containing from 2 to 4 aryl groups selected from the group consisting of phenyl and naphthyl, the amount of active initiator present ranging from 0.1 to 200 gram atoms of lithium per 100 grams of isoprene, said contacting being effected in the presence of 0.25 to 20 gram atoms of lithium per gram atom of halogen of an organic halide wherein the organic radical is selected from the group consisting of aliphatic, cycloaliphatic and aromatic radicals containing from 1 to 12 carbon atoms, inclusive, and the amount of said halogen adjuvant is sufficient to lower the inherent viscosity of the polymer product without decreasing the cis content of said polymer and without destroying the active initiator.

4. The process according to claim 3 wherein said adjuvant is an n-alkyl halide.

5. A process for producing high cis polyisoprene of improved processability characteristics which comprises contacting isoprene under polymerization conditions of $-100$ to $150°$ C. and a pressure sufficient to maintain substantially complete liquid phase conditions with an active initiator formed by reacting lithium with at least one of a group consisting of dihydroanthracene and methylnaphthalene, the amount of active initiator present ranging from 0.1 to 200 gram atoms of lithium per 100 gram atoms of isoprene, said contacting being effected in a predominantly hydrocarbon diluent and in the presence of an n-alkyl bromide wherein the alkyl radical contains from 1 to 12 carbon atoms, inclusive, said alkyl bromide being present in the amount of from 0.25 to 20 gram atoms of lithium per gram atom of halogen which amount is sufficient to lower the inherent viscosity of the polyisoprene product without sacrificing the cis content of said polyisoprene and without destroying the initiator.

6. The process according to claim 5 wherein said n-alkyl bromide is n-butyl bromide.

7. A process for producing high cis polyisoprene of improved processability characteristics which comprises contacting isoprene under polymerization conditions of −100 to 150° C. and a pressure sufficient to maintain substantially complete liquid phase condition with an active initiator formed by reacting lithium with at least one of a group consisting of dihydroanthracene and methylnaphthalene, the amount of active initiator present ranging from 0.1 to 200 gram atoms of lithium per 100 gram atoms of isoprene, said contacting being effected in a predominantly hydrocarbon diluent and in the presence of an n-alkyl halide wherein the alkyl radical contains from 1 to 12 carbon atoms, inclusive, said alkyl halide being present in the amount of from 0.25 to 20 gram atoms of lithium per gram atom of halogen which amount is sufficient to lower the inherent viscosity of the polyisoprene product without sacrificing the cis content of said polyisoprene and without destroying the initiator.

8. The process according to claim 7 wherein said n-alkyl halide is n-butyl chloride.

9. A process for producing high cis polyisoprene of improved processability characteristics which comprises contacting isoprene under polymerization conditions of −100 to 150° C. and a pressure sufficient to maintain substantially complete liquid phase conditions with an active initiator formed by reacting lithium with at least one of a group consisting of dihydroanthracene and methylnaphthalene, the amount of active initiator present ranging from 0.1 to 200 gram atoms of lithium per 100 gram atoms of isoprene, said contacting being effected in a predominantly hydrocarbon diluent and in the presence of halobenzene, said halobenzene being present in the amount of from 0.25 to 20 gram atoms of lithium per gram atom of halogen which amount is sufficient to lower the inherent viscosity of the polyisoprene product without sacrificing the cis content of said polyisoprene and without destroying the initiator.

10. A process for producing a high cis polyisoprene of improved processability characteristics which comprises contacting isoprene at a temperature in the range −100 to 150° C. and under sufficient pressure to maintain liquid phase conditions with an active initiator formed by reacting lithium with a material selected from the group consisting of polycyclic aromatic compounds, halogen derivatives of polycyclic aromatics containing from 2 to 4 halogen atoms per molecule, and polyaryl-substituted ethylenes containing from 2 to 4 aryl gropus selected from the group consisting of phenyl and naphthyl, the amount of active initiator present ranging from 0.1 to 200 gram atoms of lithium per 100 grams of isoprene, said contacting being effected in a predominantly hydrocarbon diluent and in the presence of an amount of 0.25 to 20 gram atoms of lithium per gram atom of halogen which amount is sufficient to lower the inherent viscosity of the polymer produced while increasing the cis content of said polymer without destroying the active initiator, a halogen adjuvant having a formula of HX, where X is halogen.

11. A process according to claim 10 wherein said adjuvant is hydrogen chloride.

12. The process according to claim 10 wherein said adjuvant is hydrogen bromide.

13. A process according to claim 10 wherein said initiator is formed by reacting lithium with one of a group consisting of dihydroanthracene and methylnaphthalene.

14. A process for producing a high cis polyisoprene of improved processability characteristics which comprises contacting isoprene at a temperature in the range −100 to 150° C. and under sufficient pressure to maintain liquid phase conditions with an active initiator formed by reacting lithium with a material selected from the group consisting of polycyclic aromatic compounds, halogen derivatives of polycyclic aromatics containing from 2 to 4 halogen atoms per molecule, and polyaryl-substituted ethylenes containing from 2 to 4 aryl groups selected from the group consisting of phenyl and naphthyl, the amount of active initiator present ranging from 0.1 to 200 gram atoms of lithium per 100 grams of isoprene, said contacting being effected in a predominantly hydrocarbon diluent and in the presence of an amount of 0.25 to 20 gram atoms of lithium per gram atom of hydrogen which amount is sufficient to lower the inherent viscosity of the polymer produced while increasing the cis content of said polymer without destroying the active initiator, a halogen adjuvant having a formula of $X_2$, where X is halogen.

15. A process according to claim 14 wherein said initiator is formed by reacting lithium with one of a group consisting of dihydroanthracene and methylnaphthalene.

16. A process according to claim 15 wherein said adjuvant is iodine.

References Cited by the Examiner

UNITED STATES PATENTS

| | | | |
|---|---|---|---|
| 2,920,066 | 1/1960 | Nowlin et al. | 260—94.3 |
| 2,938,020 | 5/1960 | Matlack | 260—94.3 |
| 2,959,576 | 11/1960 | Payne | 260—94.3 |
| 3,097,108 | 7/1963 | Bosmajian | 260—94.2 |

FOREIGN PATENTS 817,695   8/1959   Great Britain.

JOSEPH L. SCHOFER, *Primary Examiner.*

H. I. CANTOR, *Assistant Examiner.*